United States Patent
Uchida

(10) Patent No.: US 10,623,396 B2
(45) Date of Patent: Apr. 14, 2020

(54) SYSTEM AND METHOD FOR CONTROLLING SYSTEM

(71) Applicant: CANON KABUSHIKI KAISHA, Tokyo (JP)

(72) Inventor: Takayuki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 15/414,393

(22) Filed: Jan. 24, 2017

(65) Prior Publication Data
US 2017/0214685 A1 Jul. 27, 2017

(30) Foreign Application Priority Data
Jan. 26, 2016 (JP) .................................. 2016-012782

(51) Int. Cl.
*G06Q 30/00* (2012.01)
*H04L 29/06* (2006.01)
*H04L 29/08* (2006.01)

(52) U.S. Cl.
CPC .......... *H04L 63/0815* (2013.01); *H04L 63/10* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 9,237,145 B2 * | 1/2016 | Sondhi | H04L 63/08 |
| 2005/0204041 A1 * | 9/2005 | Blinn | H04L 63/0815 709/225 |
| 2013/0124807 A1 * | 5/2013 | Nielsen | G06F 11/1438 711/162 |
| 2014/0052864 A1 * | 2/2014 | Van Der Linden | G06F 9/5077 709/226 |
| 2015/0163206 A1 * | 6/2015 | McCarthy | G06F 21/6227 713/171 |
| 2015/0301992 A1 * | 10/2015 | Warshavsky | G06N 5/00 715/234 |
| 2015/0310188 A1 * | 10/2015 | Ford | G06F 21/10 726/28 |
| 2016/0087960 A1 * | 3/2016 | Pleau | H04L 63/0884 726/7 |

FOREIGN PATENT DOCUMENTS

| | | | | |
|---|---|---|---|---|
| JP | 2005-301424 A | | 10/2005 | |
| JP | 2011059884 A | * | 3/2011 | G06F 9/50 |

(Continued)

OTHER PUBLICATIONS

* Oasis. Identity in the Cloud Use Cases Version 1.0 (May 8, 2012). Retrieved online Jan. 29, 2020. http://docs.oasis-open.org/id-cloud/IDCloud-usecases/v1.0/cn01/IDCloud-usecases-v1.0-cn01.html (Year: 2012).*

(Continued)

*Primary Examiner* — James A Reagan

(74) *Attorney, Agent, or Firm* — Canon U.S.A., Inc. IP Division

(57) ABSTRACT

There is provided a system capable of performing cooperation through single sign-on, between a community created for each tenant in one service provision apparatus and a tenant of the other service provision apparatus.

7 Claims, 13 Drawing Sheets

(56) References Cited

FOREIGN PATENT DOCUMENTS

| JP | 2014174834 A | * | 9/2014 | ........... G06T 3/4053 |
| JP | 2015059984 A | * | 3/2015 | ............... G09C 1/00 |

OTHER PUBLICATIONS

• Ghazizadeh et al. Trusted Computing Strengthens Cloud Authentication. (Feb. 18, 2014). Retrieved online Jan. 29, 2020. https://www.hindawi.com/journals/tswj/2014/260187/ (Year: 2014).*

• Sen, Jaydip. Security and Security and Privacy Issues in Cloud Computing. (2013). Retrieved online Jan. 29, 2020. https://arxiv.org/ftp/arxiv/papers/1303/1303.4814.pdf (Year: 2013).*

\* cited by examiner

FIG. 6

| COMPANY ID | COMMUNITY NAME |
|---|---|
| 1002AA | |
| 1003AA | community1 |
| 1004AA | community2 |
| ⋮ | |

FIG. 7A https://<MY DOMAIN NAME>.serivice_b.com/abc

FIG. 7B https://<MY DOMAIN NAME>.serivice_b.com/community1/abc

FIG. 9

| button setting | |
|---|---|
| 901~ display name | document creation |
| 902~ operation | execute JavaScript |
| 903~ contents | ```
loginorg="$Site.Prefix";

var mainForm = document.createElement("form");
mainForm.action = "http://service_a/service";
mainForm.method = "GET";
document.body.appendChild(mainForm);

var tid = document.createElement("input");
tid.name = "TENANT_ID";
tid.value = <acquire company ID>
mainForm.appendChild(tid);

var sid = document.createElement("input");
sid.name = "sessionid";
sid.value = "{!$Api.Session_ID}";
mainForm.appendChild(sid);

var url = document.createElement("input");
url.name = "serverurl";
url.value = "{!$Api.Server_URL}";
mainForm.appendChild(url);

var rid = document.createElement("input");
rid.name = "recordid";
rid.value = "{!Opportunity.Id}";
mainForm.appendChild(rid);
} var sub = window.open("aboutblank","serviceA");
mainForm.submit();
}
``` |

SYSTEM AND METHOD FOR CONTROLLING SYSTEM

BACKGROUND

Field of the Disclosure

The present disclosure relates to a system and a method for controlling the system.

Description of the Related Art

Methods for performing work data management and various kinds of processing on a cloud platform service are becoming widespread. A user accesses a web page of a cloud platform service via the Internet from a web browser (hereinafter referred to as a browser) on a client computer, and the client computer displays work data to be viewed on the web page. When the user issues a document generation instruction on the screen, redirection to a document generation service occurs. The document generation service generates a document by acquiring the work data present in the cloud platform service, and transmits the generated document to the client computer or the cloud platform service. Representative examples of the cloud platform service include Salesforce CRM (registered trademark) available from Salesforce.com, Inc.

The cloud platform service and the document generation service operate in multiple tenants. A tenant is a unit representing a company or organization under a contract to use the cloud platform service or the document generation service. A service operating in multiple tenants manages data of tenants by using one system. This service separates and manages the data of each tenant to prevent the data of one tenant from being referred to by other tenants. The cloud platform service and the document generation service perform user authentication to allow a user to refer to only the data of the tenant of the user.

It is conceivable that, when the cloud platform service and the document generation service cooperate with each other, cooperation for authentication may be performed between the services without a user's authentication in each of the services. Examples of a technique for performing the cooperation for authentication between the services include a mechanism of single sign-on (hereinafter referred to as SSO) based on Security Assertion Markup Language (SAML). Japanese Patent Application Laid-Open No. 2005-301424 discusses a method for performing SSO based on SAML in authentication servers.

SUMMARY

According to an aspect of the present disclosure, a system includes a first service provision apparatus, and a second service provision apparatus, which provide a service based on single sign-on via a client terminal, by cooperating with each other. The first service provision apparatus includes a registration unit configured to register a tenant of the first service provision apparatus and a community created for each tenant of the second service provision apparatus in the second service provision apparatus, by associating the tenant and the community with each other. The client terminal includes a first acquisition unit configured to acquire information indicating the community from information of an access destination of the client terminal, when a user receiving a service provided by the second service provision apparatus issues an instruction for providing a service given by the first service provision apparatus, a second acquisition unit configured to acquire information indicating the tenant of the first acquisition unit associated with the community, by transmitting the information indicating the community to the second service provision apparatus, and a request unit configured to issue a service provision request including the acquired information indicating the tenant of the first service provision apparatus to the first service provision apparatus.

According to the system of the exemplary embodiment of the present disclosure, cooperation based on SSO can be performed between a community created for each tenant of one service provision apparatus and a tenant of the other service provision apparatus.

Further features of the present disclosure will become apparent from the following description of exemplary embodiments with reference to the attached drawings.

BRIEF DESCRIPTION OF THE DRAWINGS

FIG. 6 is a diagram illustrating an example of a company ID management table.

FIGS. 7A and 7B are diagrams each illustrating an example of a uniform resource locator (URL) of the service provision service B.

FIG. 9 is a diagram illustrating an exemplary description of button setting.

DESCRIPTION OF THE EMBODIMENTS

A cloud platform service and a document generation service have different pieces of tenant information. To perform SSO, the cloud platform service and the document generation service need to recognize each other's tenants. This is because it is necessary to know the tenant which performs the SSO, and the tenant of the other service which correspondingly performs the SSO. Furthermore, it is conceivable that, for each community established within the tenant using the one service, the SSO may be performed with the other service. However, a conventional method (as discussed in Japanese Patent Application Laid-Open No. 2005-301424) cannot recognize the organization in the other service which correspondingly performs the SSO.

The present disclosure is directed to a system capable of cooperation based on the SSO, between the community established for each tenant in one service provision apparatus and a tenant of the other service provision apparatus.

Exemplary embodiments of the disclosure will be described in detail below with reference to the drawings.

Figure 1:
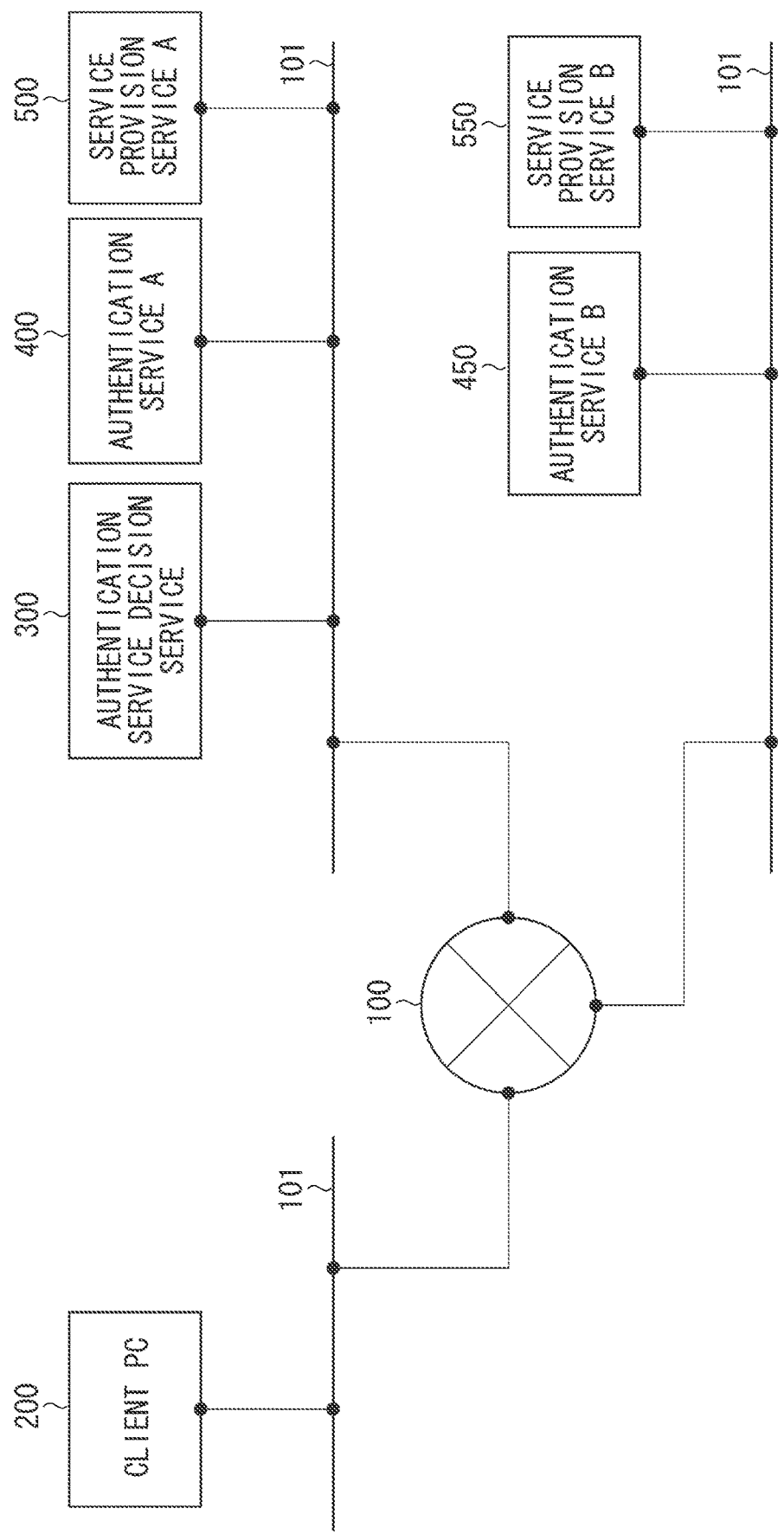
FIG. 1 is a diagram illustrating a structure of a system according to one or more aspects of the present disclosure.

FIG. 1 is a diagram illustrating a structure of a system according to one or more aspects of the present disclosure.

The system includes a wide area network (WAN) 100. In other words, a World Wide Web (WWW) system is constructed in the present exemplary embodiment. A local area network (LAN) 101 connects components with each other.

A client personal computer (PC) 200 is an information processing apparatus to be operated by a user. The client PC 200 issues a request to each of a service provision service A 500 and a service provision service B 550 as described below. An authentication service decision service 300 guides access of a user to an appropriate authentication service provision apparatus (hereinafter referred to as an identity provider (IdP)). An authentication service A 400 and an authentication service B 450 each operate as an IdP, and perform authentication. The number of the authentication services is not limited to two. The IdP which actually performs authentication varies depending on the accessing user.

The service provision service A (a first service provision apparatus) 500 and the service provision service B (a second service provision apparatus) 550 each provide a service to an authenticated user. The service provision service A 500 generates a document when a request is received from the client PC 200. The service provision service B 550 displays or updates data which it holds, according to a request from the client PC 200 or the service provision service A 500. The service provision service A 500 and the service provision service B 550 are not limited to the document generation service and the cloud platform service, and may be a type of service different from these services.

The client PC 200, the authentication service decision service 300, the authentication service A 400, the authentication service B 450, the service provision service A 500, and the service provision service B 550 are connected via the WAN 100 and the LAN 101, and can communicate with each other. The client PC 200 and each of the services may be configured on different LANs or on the same LAN. In addition, each of the services may be provided by the same apparatus. The authentication service decision service 300, the authentication service A 400, and the service provision service A 500 form a server group constructed in the same network (in an intranet). The authentication service B 450 and the service provision service B 550 form a server group constructed within the same network (within an intranet).

To receive a service, the client PC 200 first accesses the service provision service B 550. When an unauthenticated user accesses, the service provision service B 550 displays an authentication screen (not illustrated) and performs user authentication. Upon authenticating the user, the service provision service B 550 provides data for displaying work data to the client PC 200. The client PC 200 then displays the received data on a screen.

The work data screen (not illustrated) displayed by the client PC 200 presents a button, which is set to redirect to the service provision service A 500. When the button is pressed, the client PC 200 redirects the access to the service provision service A 500. In other words, it is possible to issue an instruction for providing a service given by the service provision service A 500 in cooperation with a service provided by the service provision service B 550.

When the unauthenticated user accesses, the service provision service A 500 redirects the access to the authentication service decision service 300. The authentication service decision service 300 redirects the access of the unauthenticated user to the authentication service A 400 or the authentication service B 450, whichever is appropriate. Upon authenticating the user, the authentication service A 400 or the authentication service B 450 redirects the access of the user again to the service provision service A 500. The service provision service A 500 then provides the service to the user.

Figure 2:
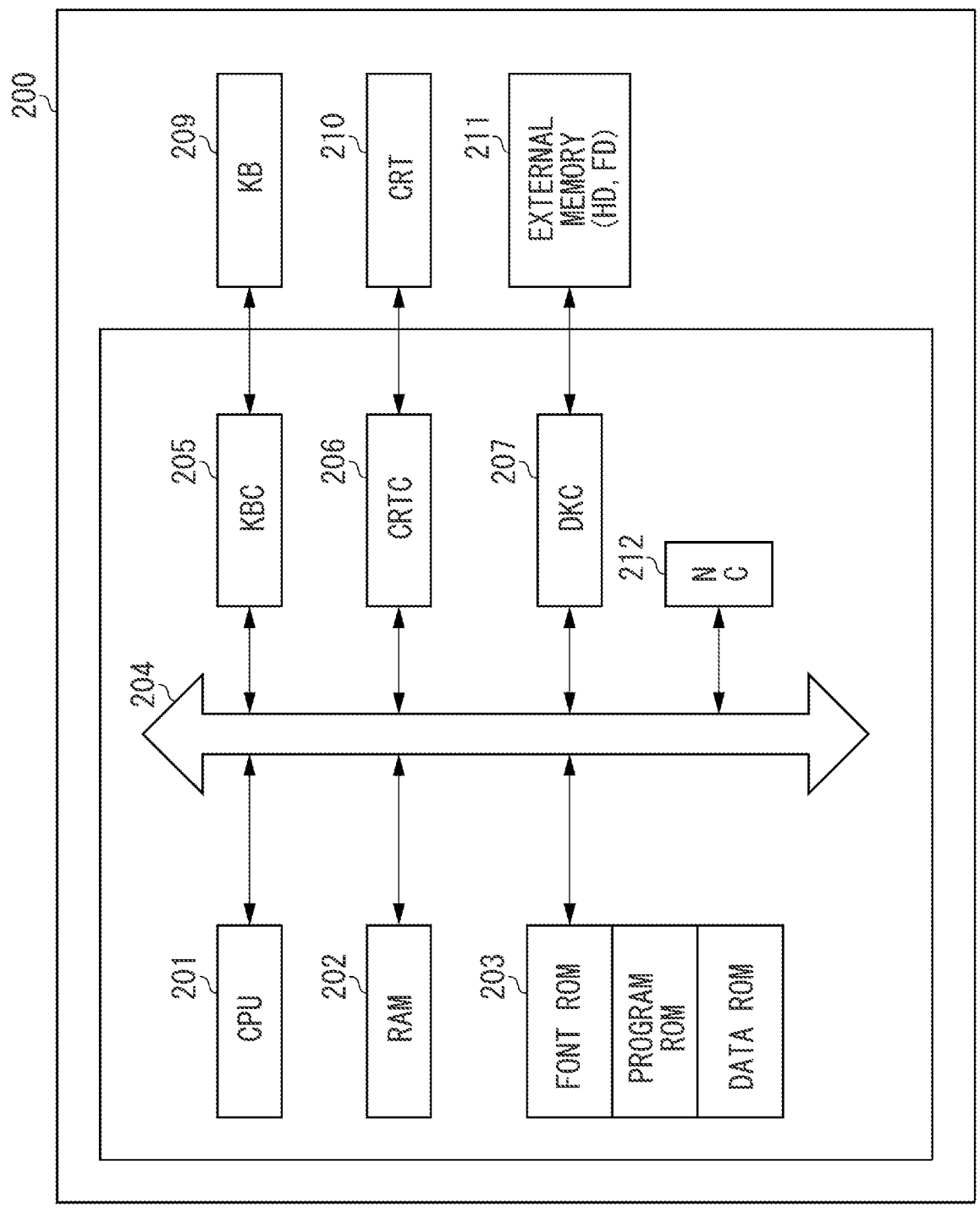
FIG. 2 is a diagram illustrating a configuration of a client PC.

FIG. 2 is a diagram illustrating a configuration of the client PC (a client terminal) 200 according to the present exemplary embodiment.

A server computer for providing each of the authentication service decision service 300, the authentication service A 400, the authentication service B 450, the service provision service A 500, and the service provision service B 550 are similarly configured. These services are configured as a server and have a configuration represented by a hardware block diagram illustrated in FIG. 2. Thus, a hardware configuration of an ordinary information processing apparatus can be applied to the client PC 200 and the server of the present exemplary embodiment.

In FIG. 2, a central processing unit (CPU) 201 executes a program such as an operating system (OS) and an application stored in a program ROM of a read only memory (ROM) 203 or a program stored in an external memory 211 (e.g., a hard disk (HD)) and loaded into a random access memory (RAM) 202. Here, the OS is an operating system that runs on a computer. The CPU 201 can implement steps in each flowchart as described below, by executing the program.

The RAM 202 functions as, for example, a main memory, a work area or the like of the CPU 201. A keyboard controller (KBC) 205 controls key input from a keyboard (KB) 209 and a pointing device (not illustrated). A cathode ray tube controller (CRTC) 206 controls display of a CRT display 210. A disk controller (DKC) 207 controls data access to the HD 211, a floppy (registered trademark) disk (FD) or the like, which store various data. A network controller (NC) 212 is connected to a network, and executes control for communication with another apparatus connected to the network.

In the following description, it is the CPU 201 that performs execution as hardware, and it is an application program installed on the HD of the external memory 211 that works as software, unless otherwise specified.

Figure 3A:
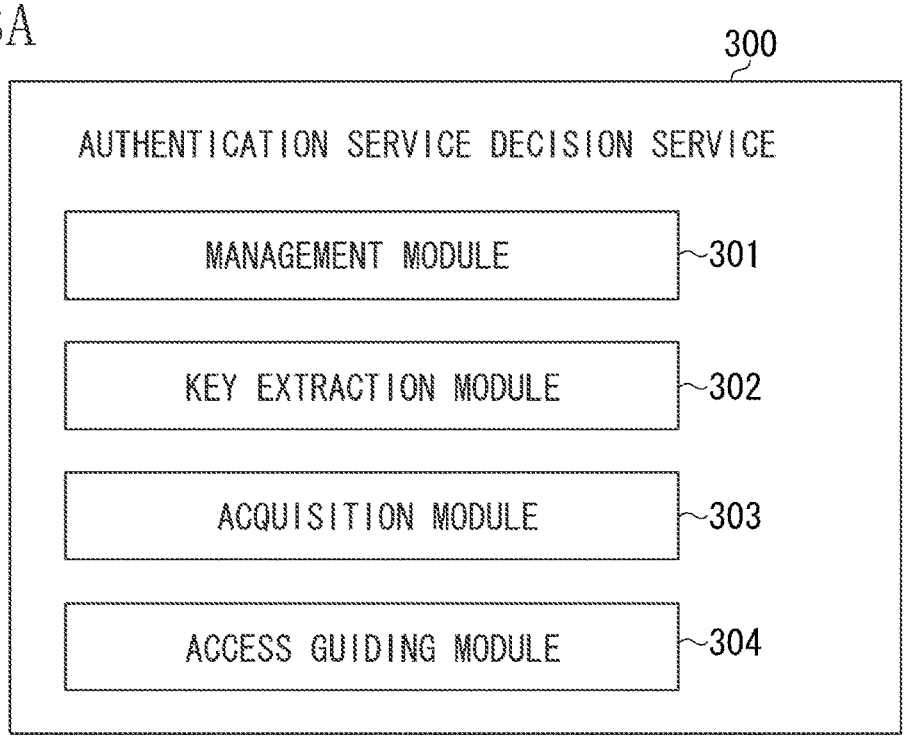
FIGS. 3A, 3B, and 3C are a diagram illustrating a module configuration of an authentication service decision apparatus and a module configuration of authentication service, respectively.
Figure 3B:
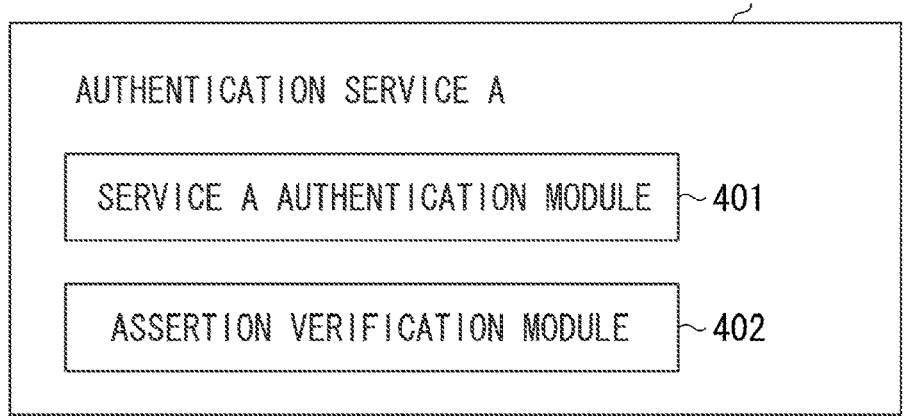

FIGS. 3A to 3B are diagrams illustrating a module configuration according to the present exemplary embodiment.

Figure 3C:
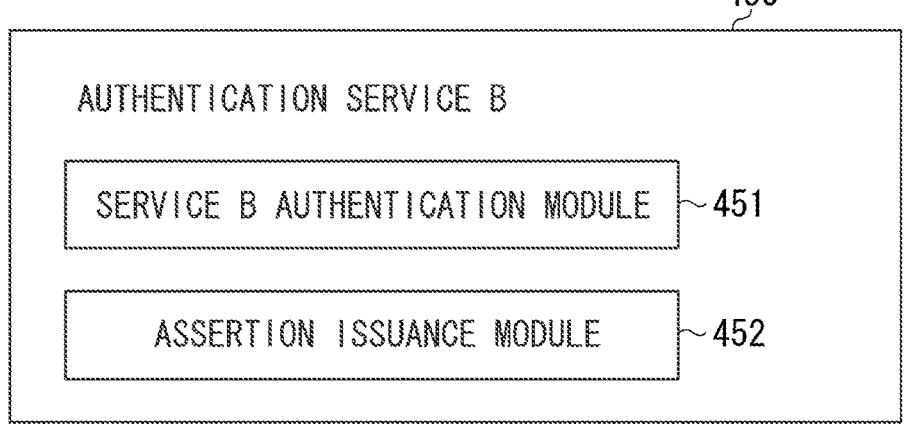

FIG. 3A illustrates the authentication service decision service 300, FIG. 3B illustrates the authentication service B 450, and FIG. 3C illustrates the authentication service A 400.

FIG. 3A is a diagram illustrating a module configuration of the authentication service decision service 300 according to the present exemplary embodiment.

The authentication service decision service 300 includes a management module 301, a key extraction module 302, an acquisition module 303, and an access guiding module 304. The management module 301 stores information as a key for deciding an authentication service and information of the authentication service by associating these two kinds of information with each other. When an unauthenticated user accesses the authentication service decision service 300, the key extraction module 302 extracts the information of the key for deciding the authentication service, from information provided when the access is made by the user. The acquisition module 303 acquires the information of the authentication service from the management module 301, by using the extracted information of the key. According to the information of the authentication service acquired from the management module 301, the access guiding module 304 guides the user to access an appropriate authentication service.

FIG. 3B is a diagram illustrating a module configuration of the authentication service A 400 according to the present exemplary embodiment. The authentication service A 400 includes a service A authentication module 401 and an assertion verification module 402. When the unauthenticated user accesses, the authentication service A 400 performs authentication, by prompting the user to input a user identification (ID) and a password. In addition, the following is performed to implement SSO. When the authentication service A 400 receives an authentication result made by the other authentication service from the user accessing the service, the assertion verification module 402 decides whether to approve the access of the user, by verifying the validity of the authentication result.

In the present exemplary embodiment, information as the authentication result is assumed to be an SAML assertion. However, the assertion SSO according to an embodiment of the present disclosure is not limited to the one using SAML and the SAML assertion. The assertion refers to authentication information, which is issued according to an authentication result, and exchanged between services.

FIG. 3C is a diagram illustrating a module configuration of the authentication service B 450 according to the present exemplary embodiment. The authentication service B 450 includes a service B authentication module 451 and an assertion issuance module 452. When the access is unauthenticated, the authentication service B 450 performs authentication, by prompting the user to input a user ID and a password. When the authentication is successful, the assertion issuance module 452 generates the SAML assertion as an authentication result, and redirects the access of the user to an authentication service capable of verifying the assertion.

Figure 4:
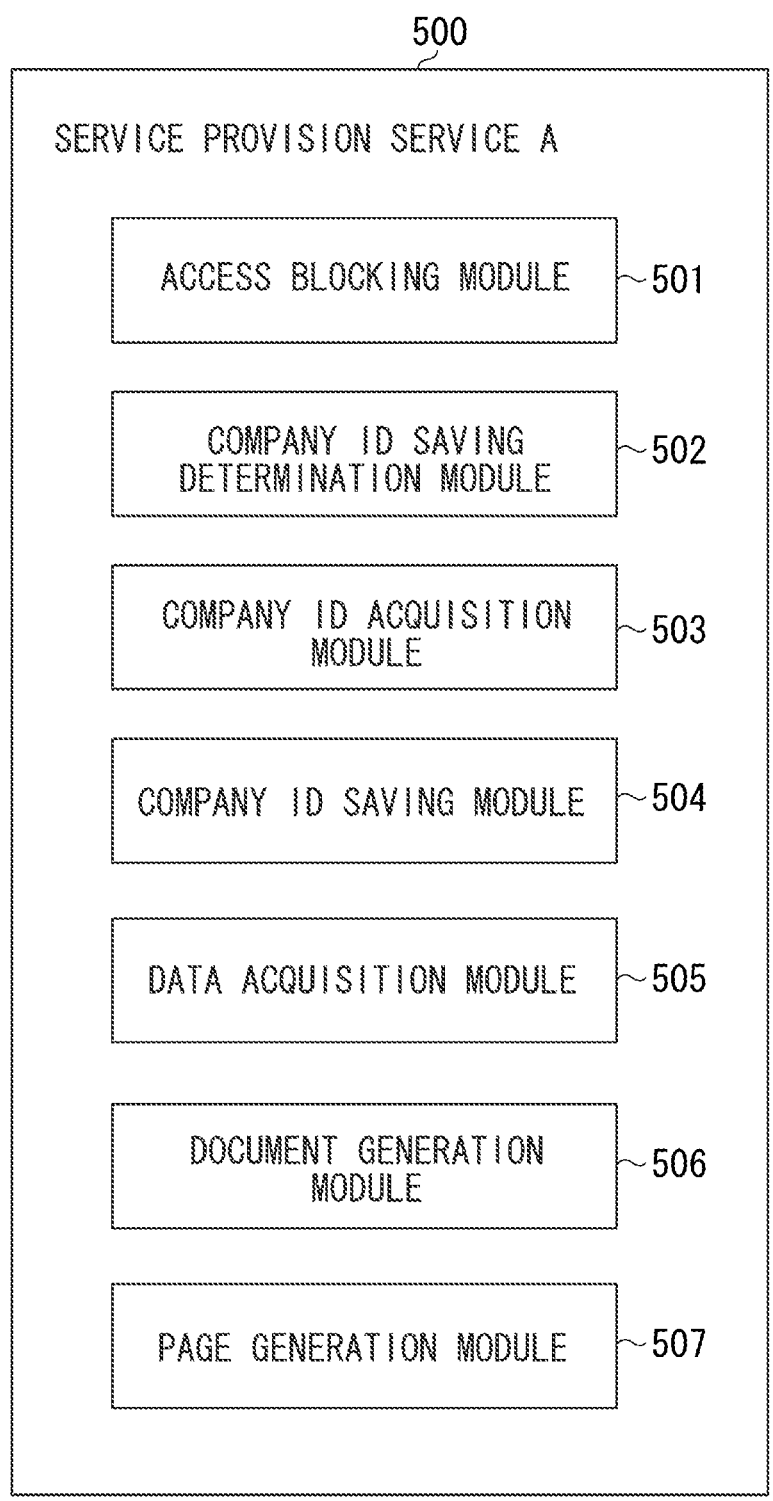
FIG. 4 is a diagram illustrating a module configuration of a service provision service A.

FIG. 4 is a diagram illustrating a module configuration of the service provision service A 500 according to the present exemplary embodiment.

The service provision service A 500 includes an access blocking module 501, a company ID saving determination module 502, a company ID acquisition module 503, and a company ID saving module 504. The service provision service A 500 further includes a data acquisition module 505, a document generation module 506, and a page generation module 507.

When the service provision service A 500 is accessed from a user, the access blocking module 501 determines whether the access is already authenticated. When the access is unauthenticated, the access blocking module 501 redirects the access to the authentication service decision service 300. When the access is already authenticated, the service provision service A 500 provides a service to the user by using the document generation module 506.

The company ID saving determination module 502 determines whether a company ID is included in uniform resource locator (URL) parameters redirected from the authentication service A 400. The company ID is affiliation information uniquely allocated to each organization or corporation that uses the present system. The company ID is also referred to as a tenant ID. For example, a user or a client terminal used by the user belongs to one of tenants, and affiliation thereof can be uniquely identified. Here, pieces of information, which represent a URL serving as position information of an access destination and various kinds of attribute information (setting values) including the URL, are collectively described as URL parameters. When the company ID is not included in the URL parameters acquired when the access is made by the user, the company ID acquisition module 503 acquires the company ID by some means. The company ID saving module 504 then saves the acquired company ID by associating this company ID with the user (or a session), into the service provision service B 550.

As an example of the method by which the company ID acquisition module 503 acquires the company ID, the authentication service A 400 sets the company ID in a Hypertext Transfer Protocol (HTTP) header and the company ID acquisition module 503 acquires the company ID from the HTTP header. The data acquisition module 505 acquires work data from the service provision service B 550. The document generation module 506 acquires a form managed by a form management module (not illustrated), and generates document data, based on the work data acquired by the data acquisition module 505 and the acquired form. The page generation module 507 generates a response page and returns the generated response page to the client PC 200.

Figure 5:
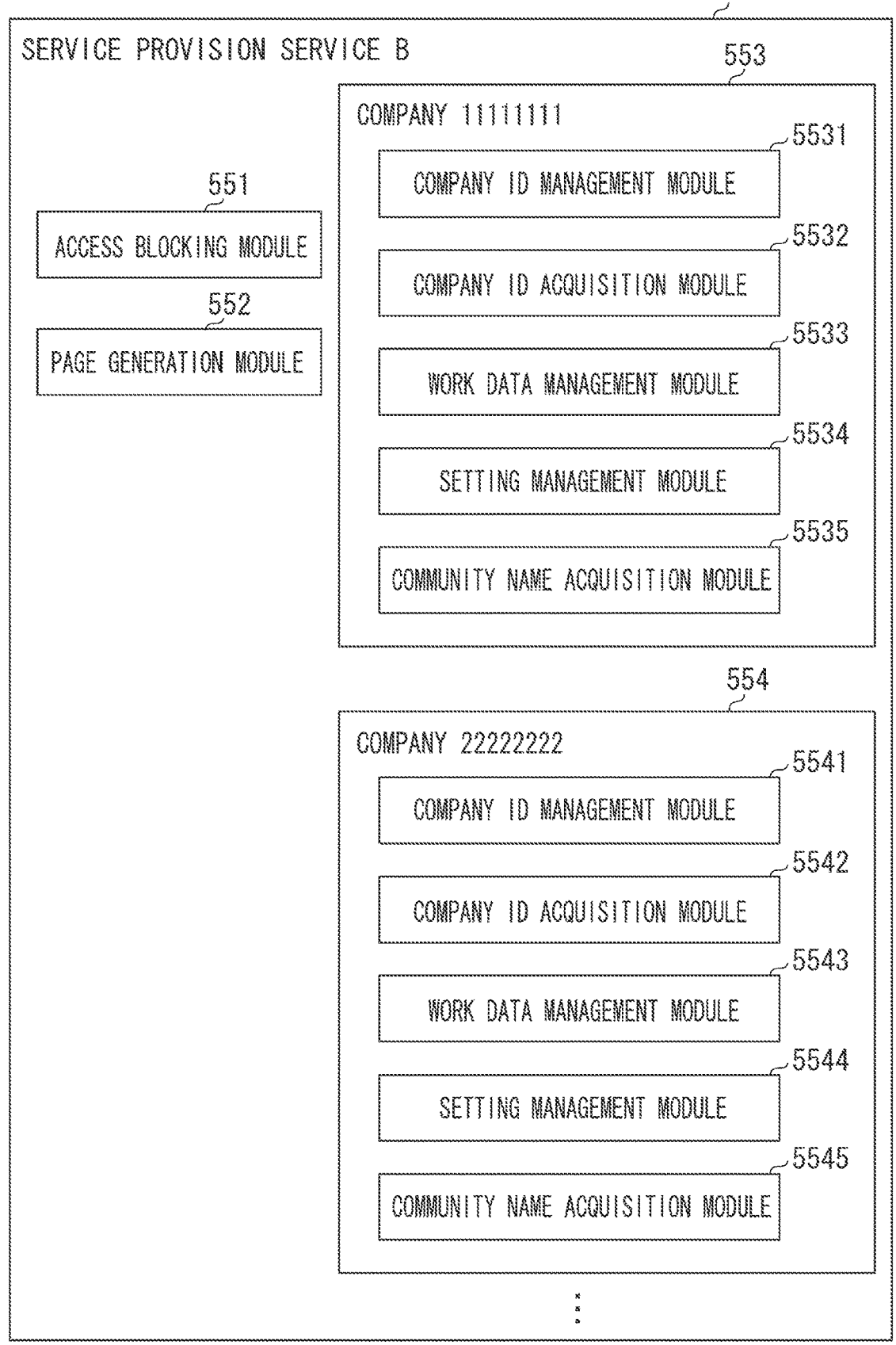
FIG. 5 is a diagram illustrating a module configuration of a service provision service B.

FIG. 5 is a diagram illustrating a module configuration of the service provision service B 550 according to the present exemplary embodiment.

The service provision service B 550 includes an access blocking module 551, a page generation module 552, company ID management modules 5531 and 5541, as well as company ID acquisition modules 5532 and 5542. The service provision service B 550 further includes work data management modules 5533 and 5543, setting management modules 5534 and 5544, as well as community name acquisition modules 5535 and 5545.

Here, in the service provision service B 550, the company ID management module, the company ID acquisition module, the work data management module, the setting management module, and the community name acquisition module are provided for each tenant (each company or contract). In other words, a user uses various modules allocated to a tenant to which the user belongs. FIG. 5 illustrates two tenants (a company 11111111 and a company 22222222). Each of the modules operates in response to a request related to each tenant. The modules allocated to each tenant may be stored in the same HD of the external memory 211, and data for the respective tenants may be logically separated and managed. Alternatively, the HD of the external memory 211 may be physically separated to manage the data.

The term "community" will be described below. A community is an organization (a child tenant) created in a tenant (a parent tenant). One or more communities are created in one tenant. The community allows data of the child tenant to be accessed by an approved user among users who belong to other companies and organizations. In other words, the community is provided for the following purpose. Users belonging to different companies and organizations are allowed to belong to one virtual organization (a child tenant), and information sharing and collaboration within this organization (the child tenant) are promoted.

In the following description, one virtual organization (a child tenant) will be referred to as "community". In addition, a conventional tenant (not a community) will be referred to as "parent tenant" for convenience of description. A user logs in to the community by using an account exclusive to the community, from a login screen exclusive to the community. The user logging in to the community can access only data, for which access is permitted beforehand with respect to the community, among data in an area of the parent tenant.

When the service provision service B 550 is accessed from a user, the access blocking module 551 determines whether the access is already authenticated. When the received access is unauthenticated, the page generation module 552 displays an authentication screen. When the access is already authenticated, the service provision service B 550 provides a service to the user. When the service provision service B 550 receives a request for display of work data, the work data management module 5533 or 5543 acquires the work data. When the screen displaying the work data includes a button, the setting management module 5534 or 5544 acquires button setting. The button setting acquired here will be described below with reference to FIG. 9.

When the service provision service B 550 receives a request for display of a company ID saving screen, the community name acquisition module 5535 or 5545 acquires community names present in a parent tenant. The company ID saving screen will be described below with reference to FIG. 8. For example, an application program interface (API) for acquiring a list of communities present in a parent tenant is used as a way of acquiring the community name. The page generation module 552 generates a response page and returns the generated response page to the client PC 200.

Figure 8:
FIG. 8 is a diagram illustrating an example of a company identification (ID) saving screen.

FIG. 8 is a diagram illustrating an example of the company ID saving screen according to the present exemplary embodiment.

A company ID saving screen 800 includes a text box for inputting a company ID, a combo box for designating a community name to be associated with the company ID, and a button for saving the data. When the button for saving the data is pressed, the company ID management module 5531 or 5541 saves the company ID and the community name by associating the company ID and the community name with each other. The user may designate the community name by inputting the community name directly, instead of making a selection from the list of community names displayed in the combo box.

The community name may be blank. When SSO cooperation is performed in a parent tenant, the community name is saved as a blank. In the present exemplary embodiment, a user having administrator authority of tenants of the service provision service B 550 is assumed to access the company ID saving screen 800. In addition, work for saving a company ID and a community name by associating the company ID and the community name with each other is performed in the company ID saving screen 800, before a processing flow illustrated in FIG. 11 to be described below is performed.

FIG. 6 is a diagram illustrating an example of a company ID management table 650 managed by the company ID management module 5531 or 5541 according to the present exemplary embodiment.

A company ID and a community name are associated with each other and saved in the company ID management table 650. The company ID and the community name input in the company ID saving screen 800 illustrated in FIG. 8 are saved in the company ID management table 650 when the button for saving the data is pressed. For the company ID having the blank community name, the SSO cooperation is performed in the parent tenant.

FIG. 9 is a diagram illustrating an exemplary description of the button setting according to the present exemplary embodiment. The description example is placed, for example, in a screen for displaying work data provided by the service provision service B 550.

Here, a display name 901 corresponding to the button is set as "document creation". As an operation 902 to be performed when the button is pressed, execution of JavaScript (registered trademark) on a browser of the client PC 200 is defined. In addition, contents 903 of the JavaScript to be executed are defined in the description example illustrated in FIG. 9.

In FIG. 9, {!$Site.Prefix} indicates acquisition of an organization (a parent tenant or a community), to which the user logs in, from a URL accessed by the browser of the client PC 200.

FIGS. 7A and 7B are diagrams each illustrating an example of the URL of the service provision service B 550. The URL is accessed by the browser of the client PC 200.

FIG. 7A is an example of the URL when the user logs in to the parent tenant. FIG. 7B is an example of the URL when the user logs in to a community having a name "community1". The browser of the client PC 200 thus acquires a character string representing the organization to which the user logs in, from a predetermined point of the URL. The details will be described below.

In FIG. 9, a part where acquisition of a company ID is defined acquires the company ID from the company ID acquisition module 5532 or 5542 to be described below. For example, a Web Service API for acquiring a company ID is available, and therefore calling the Web Service API from a client PC may be used as a method for acquiring the company ID. In this case, the client PC 200 calls the Web Service API by specifying a logged-in organization.

In FIG. 9, {!$Api.Session_ID} indicates that a session ID of an authenticated user is acquired from a session management module (not illustrated) of the service provision service B 550. In FIG. 9, {!$Api.Server_URL} indicates that the service provision service A 500 acquires a URL for accessing the service provision service B 550. In FIG. 9, {!Opportunity.Id} indicates acquisition of a record ID of a business negotiation record displayed on the screen.

When the button set as illustrated in FIG. 9 is pressed, JavaScript is executed on the browser of the client PC 200. Another window then appears, and redirection to "http://service_a/service" occurs. Here, "http://service_a/service" indicates the URL of the service provision service A 500. In addition to this URL, "TENANT_ID", "sessionid", and "serverurl" are included as URL parameters for the redirection.

The parameter "TENANT_ID" indicates the company ID. The parameter "sessionid" indicates the session ID of the authenticated user. The parameter "serverurl" indicates the URL for accessing the service provision service B 550. In the present exemplary embodiment, the company ID included in the URL parameters indicates the value of the parameter "TENANT_ID", unless otherwise specified.

When the service provision service B 550 receives a request for saving of a company ID, the company ID management module 5531 or 5541 saves the company ID into a storage unit. When the service provision service B 550 receives a request for acquisition of a company ID, the company ID acquisition module 5532 or 5542 acquires the company ID from the company ID management module 5531 or 5541 and returns the acquired company ID. The company ID acquisition module 5532 or 5542 is publicly available as, for example, a Web Service so that API can receive a company ID acquisition request from the browser of the client PC 200.

Figure 10:
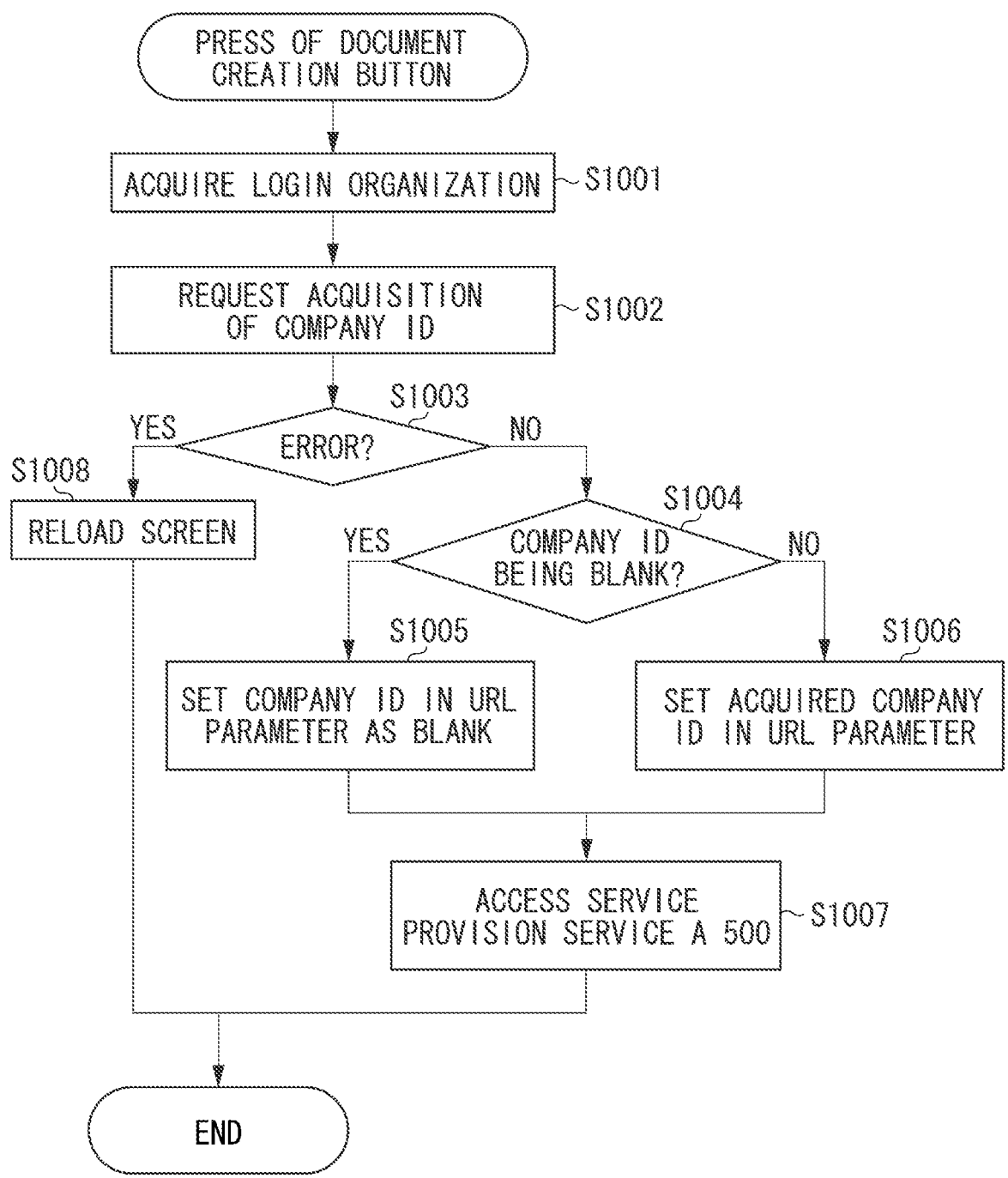
FIG. 10 illustrates a flow to be executed by a browser of the client PC.

FIG. 10 illustrates a flow to be executed by the browser of the client PC 200 according to the present exemplary embodiment.

This flow starts when the user presses the "document creation" button on a work data screen (not illustrated), which is displayed on the browser of the client PC 200 when the user accesses the service provision service B 550. When the user presses the press of the button, the browser executes JavaScript set for the button, thereby executing this flow.

The "document creation" button is the button set as illustrated in FIG. 9, and placed in the work data screen (not illustrated) beforehand by the user having the administrator authority of the tenants of the service provision service B 550.

In step S1001, the browser of the client PC 200 acquires a character string representing an organization (a parent tenant or a community) to which the user is logging in from a URL accessed by the user. When the user logs in to the parent tenant, the browser of the client PC 200 acquires a character string of null (a null character). When the user logs in to the community, the browser of the client PC 200 can acquire the community name of the community.

In step S1002, the browser of the client PC 200 issues a request for acquisition of a company ID from the service provision service B 550. The service provision service B 550 gives a public available Web Service API for acquiring a company ID. When an organization name is designated for a parameter "loginOrg" of the Web Service API, the Web Service API returns a company ID associated with the organization. Here, the character string acquired in step S1001 is designated for the parameter "loginOrg".

In step S1003, the browser of the client PC 200 determines whether the processing for acquiring the company ID is completed without error. When the processing is completed without error (NO in step S1003), the operation transitions to step S1004. When an error occurs (YES in step 31003), the operation transitions to step 31008. In step S1004, the browser of the client PC 200 determines whether the company ID acquired from the service provision service B 550 is blank.

When the acquired company ID is blank (YES in step S1004), the operation transitions to step S1005. In step 31005, the browser of the client PC 200 sets a blank as the company ID for the URL parameter. When the acquired company ID is not blank (NO in step S1004), the operation transitions to step S1006. In step S1006, the browser of the client PC 200 sets the acquired company ID for the URL parameter. Next, in step S1007, the browser of the client PC 200 accesses the service provision service A 500, and makes a request for provision of a service.

In step S1008, the browser of the client PC 200 reloads the screen. Examples of a case where an error occurs in step S1003 include a case where a session of an authenticated user is disconnected in the service provision service B 550. In this case, the browser displays the authentication screen again by reloading the screen, and after the authentication is successful, the screen can return to the screen which has been displayed just before. In addition, the browser may display an error screen without reloading the screen in step S1008. The flow performed by the browser of the client PC 200 thus ends.

Figure 11:
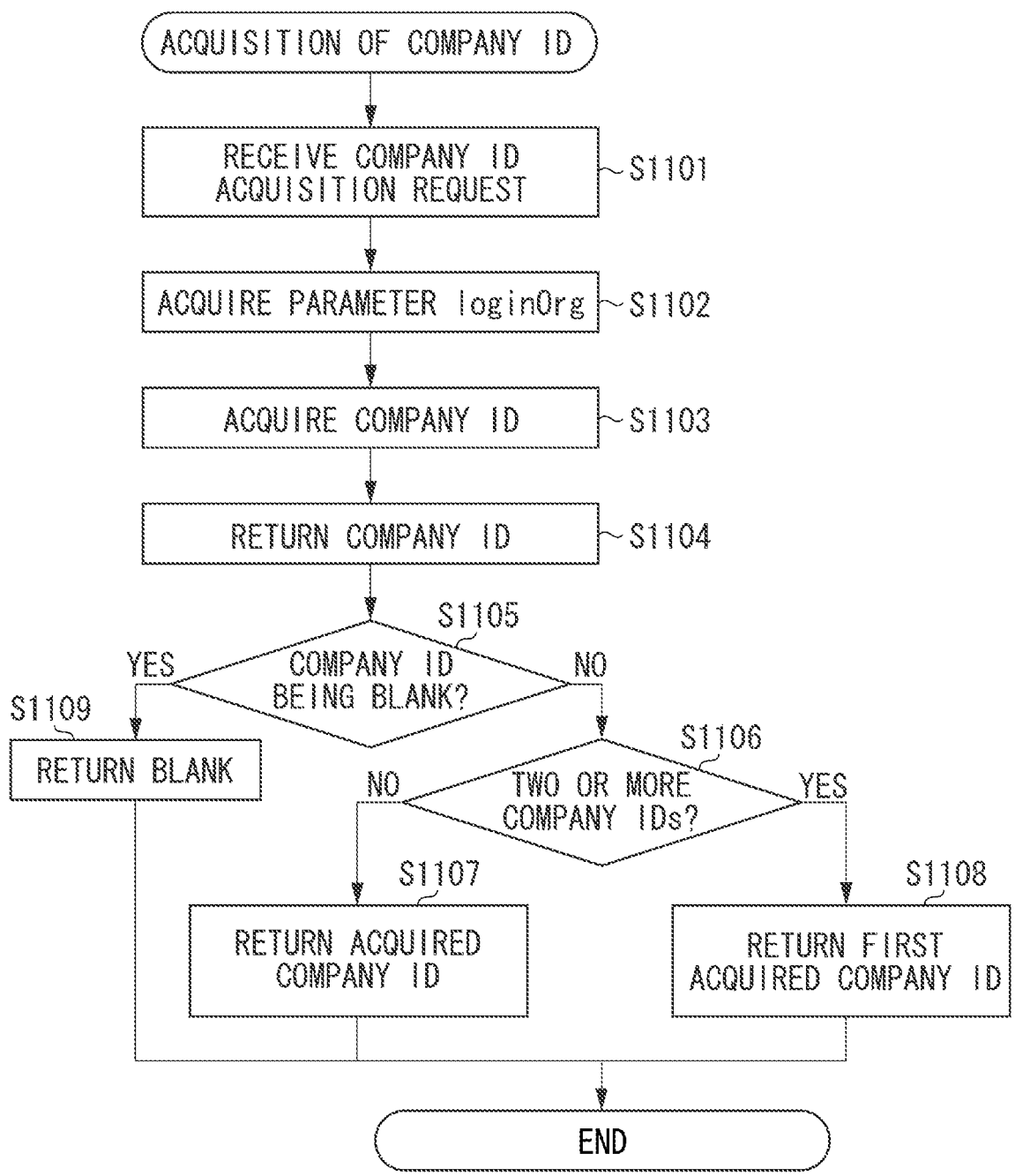
FIG. 11 illustrates a flow to be executed by the service provision service B according to one or more aspects of the present disclosure.

FIG. 11 illustrates a flow to be executed by the service provision service B 550, according to the present exemplary embodiment. This flow begins when the company ID acquisition request is issued to the service provision service B 550 by the browser of the client PC 200 in step S1002 illustrated in FIG. 10.

In step S1101, the service provision service B 550 receives the company ID acquisition request from the client PC 200. In step S1102, the company ID acquisition module 5532 or 5542 acquires the value of "loginOrg" from the company ID acquisition request. In step S1103, the company ID acquisition module 5532 or 5542 requests acquisition of a company ID from the company ID management module 5531 or 5541, by designating the value of the parameter "loginOrg" acquired in step S1102.

In step S1104, the company ID management module 5531 or 5541 searches the company ID management table 650, thereby acquiring a record having a value in the column "community name" matching with the value of loginOrg designated in the request. The company ID management module 5531 or 5541 then returns the company ID of the acquired record, to the company ID acquisition module 5532 or 5542. When the value of loginOrg is null, the company ID management module 5531 or 5541 returns the company ID of a record in which a community name is blank. For example, in the company ID management table 650 illustrated in FIG. 6, a community name corresponding to a company ID "1002AA" is blank. The company ID management module 5531 or 5541 therefore returns the company ID "1002AA". In other words, SSO cooperation with the parent tenant is performed when the value of loginOrg is null.

In step S1105, the company ID acquisition module 5532 or 5542 determines whether the value of the company ID returned from the company ID management module 5531 or 5541 is blank. When the company ID acquisition module 5532 or 5542 determines that the company ID is blank (YES in step S1105), the operation transitions to step S1109. When the company ID acquisition module 5532 or 5542 determines that the company ID is not blank (NO in step S1105), the operation transitions to step S1106. Here, when the company ID is blank, it indicates that the company ID management module 5531 or 5541 holds no company ID corresponding to the user or the client PC 200 of the received request.

In step S1106, the company ID acquisition module 5532 or 5542 determines whether two or more company IDs are acquired. When the company ID acquisition module 5532 or 5542 determines that one company ID is acquired (NO in step S1106), the operation transitions to step S1107. When the company ID acquisition module 5532 or 5542 determines that two or more company IDs are acquired (YES in step S1106), the operation transitions to step S1108. In step S1107, the company ID acquisition module 5532 or 5542 returns the acquired company ID to the client PC 200 as a response. In step S1108, the company ID acquisition module 5532 or 5542 returns a first company ID among the acquired company IDs to the client PC 200 as a response.

In step S1108, the company IDs are acquired in the order that the company IDs from the company ID management module 5531 or 5541 have been saved. However, the order of acquisition is not limited to the order that the company IDs have been saved. The company IDs may be acquired in the order according to other bases. In step S1109, the company ID acquisition module 5532 or 5542 returns the company ID being blank to the client PC 200 as a response. This ends the flow.

The service provision service A 500 executes a flow that starts in response to access to the fact that the browser of the client PC 200 (in step S1007 illustrated in FIG. 10) accesses the service provision service A 500. This flow will not be described in detail. A flow in the authentication service A 400 and the authentication service B 450 when SSO is implemented based on SAML will not be described in detail either. Only an operation will be described here which is performed in a case where the browser of the client PC 200 accesses the service provision service A 500, and this access is not authenticated.

As a result of the redirection of the access in step S1007 illustrated in FIG. 10, the browser of the client PC 200 accesses the service provision service A 500. It is then determined whether the access is already authenticated. When the access is already authenticated, the service provision service A 500 provides the service. When the access is not authenticated, processing for implementing SSO in the authentication service A 400 and the authentication service B 450 is executed. When the access is not authenticated, the authentication service A 400 determines whether a company ID is included in URL parameters.

When a company ID is included in URL parameters, the access is redirected to the URL of the service provision service B 550 for which SSO is set with the company ID. The authentication service B 450 issues an assertion corresponding to authentication information, thereby redirecting the access to the authentication service A 400. The authentication service A 400 verifies whether the assertion included in the received redirection is valid. When the authentication service A 400 determines that the assertion is valid, the service provision service A 500 provides the service. By executing this flow, the SSO is performed between the user logging in to the community of the service provision service B 550 and the user associated with the company ID of the service provision service A 500.

As described above, according to the present exemplary embodiment, in a first service provision apparatus, cooperation based on the SSO can be performed with a tenant of an appropriate second service provision apparatus corresponding to an organization (a parent tenant or a community) to which a user logs in.

A second exemplary embodiment according to one or more aspects of the present disclosure will be described with reference to the drawings. Portions in common with the first exemplary embodiment will not be described, and only different portion will be described below. According to the first exemplary embodiment, the company ID saving screen 800 is accessed, and a company ID and a community name are associated with each other therein and saved beforehand. In other words, when a user logs in to the community, a record of the company ID associated with the community is present in the company ID management table 650. In the present exemplary embodiment, a case where a user logs in to a community that is not associated with a company ID beforehand will be described.

Figure 12:
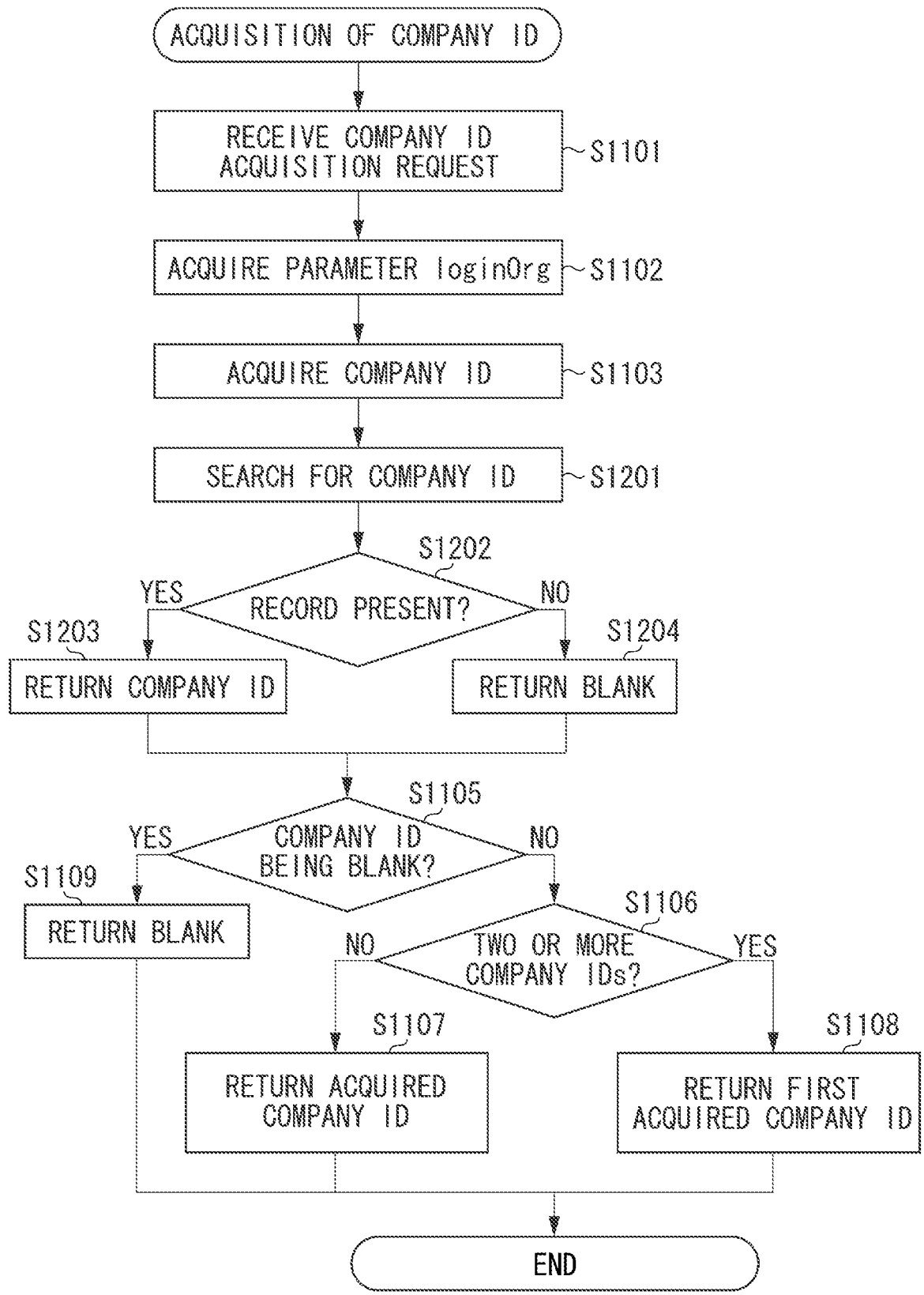
FIG. 12 illustrates a flow to be executed by the service provision service B according to one or more aspects of the present disclosure.

FIG. 12 illustrates a flow to be executed by the service provision service B 550, according to the present exemplary embodiment. Steps similar to steps in FIG. 11 are provided with the same reference numerals as those in FIG. 11, and only different part will be described below. Assume that a user logs in to a community "community3" of the service provision service B 550. In addition, the records illustrated in FIG. 6 are saved in the company ID management table 650.

In step S1103, the company ID acquisition module 5532 or 5542 issues a request for acquisition of a company ID from the company ID management module 5531 or 5541, by designating the value "community3" of loginOrg acquired in step S1102. In step S1201, the company ID management module 5531 or 5541 searches the company ID management table 650, for a record in which a value in the column "community name" matches the value "community3" of loginOrg designated in the request.

In step S1202, the company ID management module 5531 or 5541 determines whether a record in which a value of "community name" matches "community3" is present. When the company ID management module 5531 or 5541 determines that the matching record is present (YES in step S1202), the operation transitions to step S1203. When the company ID management module 5531 or 5541 determines that the matching record is not present (NO in step S1202), the operation transitions to step S1204. In step S1203, the company ID management module 5531 or 5541 returns the company ID of the record acquired from the company ID management table 650, to the company ID acquisition module 5532 or 5542. In step S1204, the company ID management module 5531 or 5541 returns a blank to the company ID acquisition module 5532 or 5542.

The service provision service A 500 executes a flow that starts in response to access to the service provision service A 500 by the browser of the client PC 200 (in step S1007 illustrated in FIG. 10). This flow will not be described in detail. Only an operation to be performed in a case where access to the service provision service A 500 is made by the browser of the client PC 200, and this access is not authenticated will be described here.

The user logs in to the community "community3" of the service provision service B 550. At this moment, when the browser of the client PC 200 accesses the service provision service A 500, no company ID is included in the URL parameters of the access as described above. Therefore, the authentication service A 400 displays a company ID input screen (not illustrated). In the company ID input screen, the user inputs the company ID of the company to which the user belongs. When the company ID is input via the company ID input screen, the authentication service A 400 redirects the access to the URL of the service provision service B 550 for which SSO with the company ID is set.

The authentication service B 450 redirects the access to the authentication service A 400 by issuing an assertion corresponding to authentication information. The authentication service A 400 verifies whether the assertion included in the redirection is valid. When the authentication service A 400 determines that the assertion is valid, the service provision service A 500 provides the service. The execution of this flow enables the SSO between the user logging in to the community "community3" of the service provision service B 550 and the user associated with the company ID of the service provision service A 500.

As described above, according to the present exemplary embodiment, when the user has logged in to a community that is not associated with a company ID beforehand, SSO based on SAML is performed by the user inputting a company ID. Therefore, the SSO for each community can be performed in an appropriate tenant.

A third exemplary embodiment according to one or more aspects of the present disclosure will be described with reference to the drawings. Portions in common with the first and second exemplary embodiments will not be described, only different portions will be described below. In the present exemplary embodiment, a case will be described where a user logs in to a community that is not associated with a company ID beforehand, as in the second exemplary embodiment.

Figure 13:
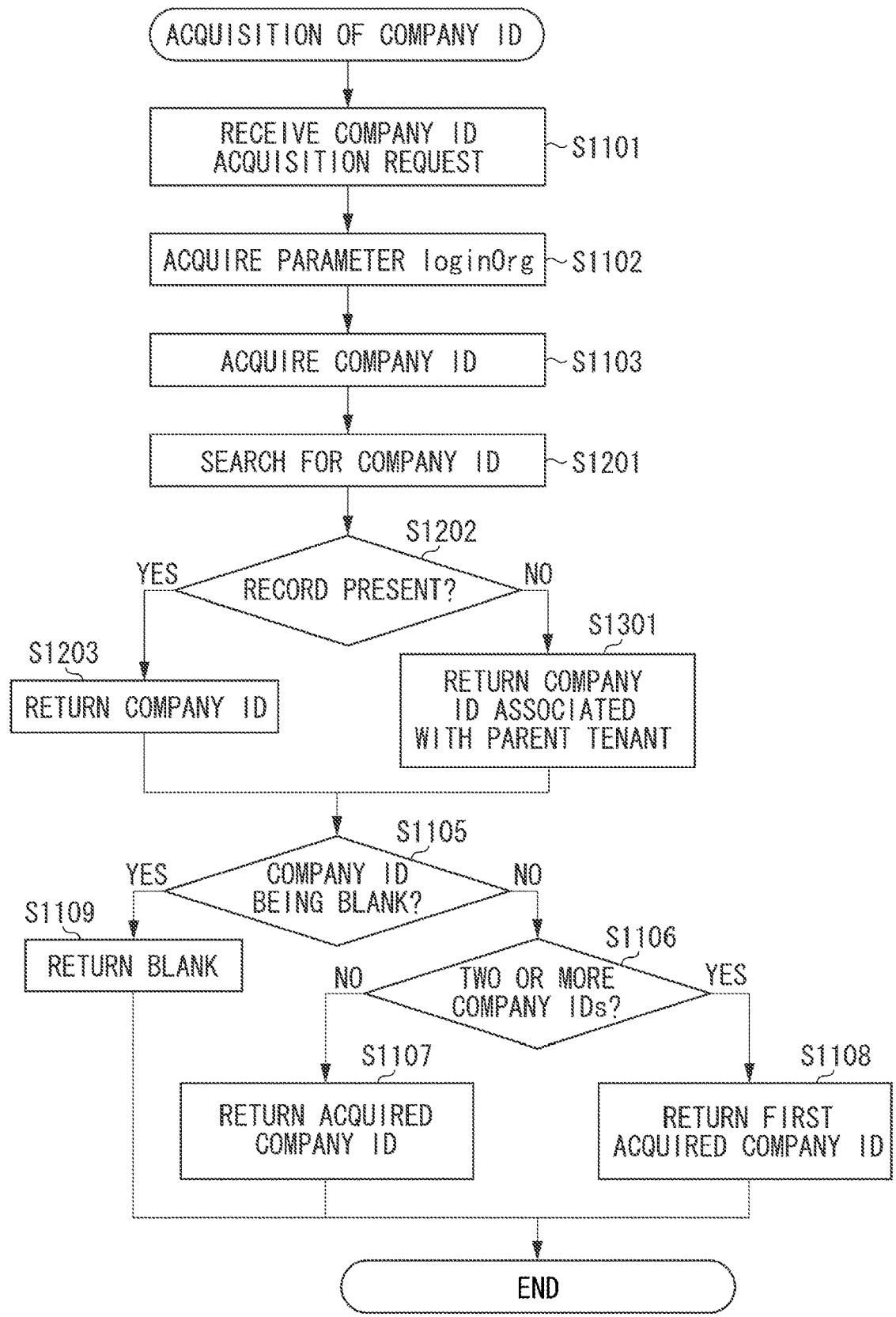
FIG. 13 illustrates a flow to be executed by the service provision service B according to one or more aspects of the present disclosure.

FIG. 13 illustrates a flow to be executed by the service provision service B 550, according to the present exemplary embodiment. Steps similar to steps in FIG. 12 are provided with the same reference numerals as those in FIG. 12, and only different portions will be described below. Assume that a user is logging in to the community "community3" of the service provision service B 550. In addition, the records illustrated in FIG. 6 are saved in the company ID management table 650.

In step S1103, the company ID acquisition module 5532 or 5542 issues a request for acquisition of a company ID from the company ID management module 5531 or 5541, by designating the value "community3" of loginOrg acquired in step S1102. In step S1201, the company ID management module 5531 or 5541 searches the company ID management table 650, for a record in which a value in the column "community name" matches the value "community3" of loginOrg designated in the request.

In step S1202, the company ID management module 5531 or 5541 determines whether a record in which a value of "community name" matches the "community3" is present. When the company ID management module 5531 or 5541 determines that the matching record is present (YES in step S1202), the operation transitions to step S1203. When the company ID management module 5531 or 5541 determines that the matching record is not present (NO in step S1202), the operation transitions to step S1301. In step S1203, the company ID management module 5531 or 5541 returns the company ID of the record acquired from the company ID management table 650, to the company ID acquisition module 5532 or 5542. In step S1301, the company ID management module 5531 or 5541 searches the company ID management table 650 to acquire a record in which a value in the column "community name" is blank. The company ID management module 5531 or 5541 then returns the company ID of the acquired record, to the company ID acquisition module 5532 or 5542.

The service provision service A 500 executes a flow that begins in response to access to the service provision service A 500 by the browser of the client PC 200 (in step S1007 illustrated in FIG. 10). This flow will not be described in detail. Only an operation to be performed in a case where access to the service provision service A 500 is made by the browser of the client PC 200, and this access is not authenticated will be described here.

The user is logging in to the community "community3" of the service provision service B 550. At this moment, when the browser of the client PC 200 accesses the service provision service A 500, the company ID "1002AA" is included in URL parameters for the access, according to the processing described above. The access is redirected to the URL of the service provision service B 550 for which SSO is set with respect to this company ID.

The authentication service B 450 issues an assertion corresponding to authentication information and redirects the access to the authentication service A 400. The authentication service A 400 verifies whether the assertion included in the received redirection is valid. When the authentication service A 400 determines that the assertion is valid, the service provision service A 500 provides the service. The execution of this flow enables the SSO between the user logging in to the community "community3" of the service provision service B 550 and the user associated with the company ID "1002AA" of the service provision service A 500.

As described above, according to the present exemplary embodiment, when a user has logged in to a community that is not associated with a company ID beforehand, the SSO based on SAML is performed using the company ID associated with a parent tenant. In other words, when the user has logged in to the parent tenant beforehand, and the browser of the client PC 200 has an effective session ID of the parent tenant, the SSO is performed in the parent tenant. Therefore, the service can be received from the service provision service A 500. When the user has not logged in to the parent tenant, the company ID input screen is displayed, as in the second exemplary embodiment.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-012782, filed Jan. 26, 2016, which is hereby incorporated by reference herein in its entirety.

What is claimed is:

1. A system comprising:
   a first service provision apparatus; and
   a second service provision apparatus,
   wherein the first service provision apparatus cooperates with the second service provision apparatus to provide a service based on single sign-on via a client terminal,
   wherein the first service provision apparatus includes a registration unit configured to register information of a plurality of tenants managed by the first service provision apparatus in association with information of a plurality of communities, which are managed by the second service provision apparatus and represent virtual organizations different from and formed in the tenants serving as parent tenants, on one-to-one correspondence, and
   wherein the client terminal includes
   a web browser;
   a login unit configured to log in to the second service provision apparatus,
   wherein the second service provision apparatus issues an assertion to implement single sign-on as a result of the client terminal having logged in,
   a first acquisition unit configured to, in response to execution of a program on the web browser performed in response to an instruction from a user, obtain information of a community of the second service provision apparatus to which the user is logged in from a URL of an access destination that the web browser is accessing, a second acquisition unit configured to acquire information indicating a tenant of the first service provision apparatus associated with the community, by transmitting the information indicating the community to the second service provision apparatus, and
a request unit configured to issue a service provision request including the acquired information indicating the tenant of the first service provision apparatus to the first service provision apparatus,
wherein the second service provision apparatus includes
a search unit configured to search for the tenant of the first service provision apparatus associated with the community, based on the information indicating the community received from the second acquisition unit of the client terminal, and
a return unit configured to transmit the tenant of the first service provision apparatus with the community,
wherein the return unit returns information indicating a parent tenant to which the community belongs, to the second acquisition unit in a case where the tenant of the first service provision apparatus associated with the community is not present,
wherein the assertion is issued, thereby the client apparatus is redirected to the first service provision apparatus, and in a case where it is verified that the assertion is valid, single sign-on is performed in the tenant of the first service provision apparatus associated with the community to the second service.

2. The system according to claim 1,
wherein the registration unit registers a null character in a tenant of the first service provision apparatus corresponding to a parent tenant to which the community belongs, by associating the tenant with the null character,
wherein the first acquisition unit acquires the null character as the information indicating the community in a case where the user receives the service provided by the second service provision apparatus by logging in to the parent tenant, and
wherein the second acquisition unit acquires information indicating the tenant of the first service provision apparatus associated with the null character.

3. The system according to claim 1,
wherein the first service provision apparatus includes a display unit configured to display a screen for inputting the information indicating the tenant in a case where the information indicating the tenant is not included in the service provision request received from the request unit of the client terminal, and
wherein the first service provision apparatus implements cooperation based on the single sign-on with the second service provision apparatus, based on the input information indicating the tenant.

4. The system according to claim 1, wherein each of the units included in the client terminal is implemented by JavaScript to be executed when the user issues the instruction for providing the service given by the first service provision apparatus.

5. A method for controlling a system in which a first service provision apparatus cooperates with a second service provision apparatus to provide a service based on single sign-on via a client terminal, the method comprising:
causing the first service provision apparatus to register information of a plurality of tenants managed by the first service provision apparatus in association with information of a plurality of communities, which are managed by the second service provision apparatus and represent virtual organizations different from and formed in the tenants serving as parent tenants, on one-to-one correspondence;
logging in to the second service provision apparatus,
wherein the second service provision apparatus issues an assertion to implement single sign-on as a result of the client terminal having logged in,
causing the client terminal to, in response to execution of a program on a web browser performed in response to an instruction from a user, obtain information of a community of the second service provision apparatus to which the user is logged in from a URL of an access destination that the web browser is accessing;
causing the client terminal to transmit the acquired information indicating the community to the second service provision apparatus;
causing the second service provision apparatus to acquire information indicating a tenant of the first service provision apparatus associated with the community, by transmitting the information indicating the community, based on the transmitted information indicating the community;
causing the second service provision apparatus to transmit the acquired information indicating the tenant to the client terminal;
causing the client terminal to issue a service provision request including the transmitted information indicating the tenant, to the first service provision apparatus; and
causing the first service provision apparatus to provide the service through the single sign-on to the user of the accessed client terminal, based on the information indicating the tenant,
wherein the second service provision apparatus includes
searching for the tenant of the first service provision apparatus associated with the community, based on the information indicating the community received from the client terminal, and
transmitting the tenant of the first service provision apparatus with the community,
wherein transmitting information indicating a parent tenant to which the community belongs, in a case where the tenant of the first service provision apparatus associated with the community is not present,
wherein the assertion is issued, thereby the client apparatus is redirected to the first service provision apparatus, and in a case where it is verified that the assertion is valid, single sign-on is performed in the tenant of the first service provision apparatus associated with the community to the second service.

6. A client terminal for receiving a service provided through single sign-on by a first service provision apparatus and a second service provision apparatus cooperating with each other, the client terminal comprising:
a login unit configured to log in to the second service provision apparatus,
wherein the second service provision apparatus issues an assertion to implement single sign-on as a result of the client terminal having logged in,
a first acquisition unit configured to, in response to execution of a program on a web browser performed in response to an instruction from a user, obtain information of a community of the second service provision apparatus to which the user is logged in from a URL of an access destination that the web browser is accessing;
a second acquisition unit configured to acquire information indicating a tenant of the first service provision apparatus associated with the community, by transmitting the information indicating the community to the second service provision apparatus; and a request unit configured to issue a service provision request including the acquired information indicating the tenant of the first service provision apparatus, to the first service provision apparatus, wherein the second service provision apparatus includes a search unit configured to search for the tenant of the first service provision apparatus associated with the community, based on the information indicating the community received from the second acquisition unit of the client terminal, and a return unit configured to transmit the tenant of the first service provision apparatus with the community, wherein the return unit returns information indicating a parent tenant to which the community belongs, to the second acquisition unit in a case where the tenant of the first service provision apparatus associated with the community is not present, wherein the assertion is issued, thereby the client apparatus is redirected to the first service provision apparatus, and in a case where it is verified that the assertion is valid, single sign-on is performed in the tenant of the first service provision apparatus associated with the community to the second service.

7. A computer-readable storage medium that stores a program for controlling a client terminal which receives a service provided through single sign-on by a first service provision apparatus and a second service provision apparatus cooperating with each other, wherein the program is transmitted to the client terminal, when a user receiving a service given by the second service provision apparatus issues an instruction for providing a service given by the first service provision apparatus, and the program causing the client terminal to serve as:

a login unit configured to log in to the second service provision apparatus, wherein the second service provision apparatus issues an assertion to implement SSO as a result of the client terminal having logged in, a first acquisition unit configured to, in response to execution of a program on a web browser performed in response to an instruction from a user, obtain information of a community of the second service provision apparatus to which the user is logged in from a URL of an access destination that the web browser is accessing;

a second acquisition unit configured to acquire information indicating a tenant of the first service provision apparatus associated with the community, by transmitting the information indicating the community to the second service provision apparatus; and a request unit configured to issue a service provision request including the acquired information indicating the tenant of the first service provision apparatus, to the first service provision apparatus, wherein the second service provision apparatus includes a search unit configured to search for the tenant of the first service provision apparatus associated with the community, based on the information indicating the community received from the second acquisition unit of the client terminal, and a return unit configured to transmit the tenant of the first service provision apparatus with the community, wherein the return unit returns information indicating a parent tenant to which the community belongs, to the second acquisition unit in a case where the tenant of the first service provision apparatus associated with the community is not present, wherein the assertion is issued, thereby the client apparatus is redirected to the first service provision apparatus, and in a case where it is verified that the assertion is valid, single sign-on is performed in the tenant of the first service provision apparatus associated with the community to the second service.

* * * * *